US005670277A

United States Patent [19]
Barker et al.

[11] Patent Number: 5,670,277
[45] Date of Patent: Sep. 23, 1997

[54] LITHIUM COPPER OXIDE CATHODE FOR LITHIUM CELLS AND BATTERIES

[75] Inventors: Jeremy Barker; M. Yazid Saidi, both of Henderson, Nev.

[73] Assignee: Valence Technology, Inc., Henderson, Nev.

[21] Appl. No.: 664,092

[22] Filed: Jun. 13, 1996

[51] Int. Cl.$^6$ .................................................. H01M 4/02
[52] U.S. Cl. ........................................................ 429/220
[58] Field of Search .................................. 429/218, 194, 429/220

[56] References Cited

U.S. PATENT DOCUMENTS

| | | |
|---|---|---|
| 4,246,253 | 1/1981 | Hunter . |
| 4,828,834 | 5/1989 | Nagaura et al. . |
| 5,135,732 | 8/1992 | Barboux et al. . |
| 5,196,279 | 3/1993 | Tarascon . |
| 5,286,582 | 2/1994 | Tahara et al. ............ 429/218 |
| 5,418,090 | 5/1995 | Koksbang et al. . |
| 5,425,932 | 6/1995 | Tarascon . |
| 5,449,577 | 9/1995 | Dahn et al. ............... 429/94 |
| 5,470,678 | 11/1995 | Yumiba et al. ............ 429/194 |
| 5,547,785 | 8/1996 | Yumiba et al. ............ 429/220 |

FOREIGN PATENT DOCUMENTS

| | | |
|---|---|---|
| 62-190657 | 8/1987 | Japan . |
| 1-163969 | 6/1989 | Japan . |

OTHER PUBLICATIONS

J.M. Tarascon, E. Wang, F.K. Shokoohi, W.R. McKinnon, and S. Colson, "The Spinel Phase of LiMn$_2$O$_4$ as a Cathode in Secondary Lithium Cells", J. Electrochem. Soc., vol. 138, No. 10, 2859–2864, Oct. 1991.

J.M. Tarascon and D. Guyomard, "Li Metal–Free Rechargeable Batteries Based on Li$_{1+x}$Mn$_2$O$_4$ Cathodes (0≦x≦1) and Carbon Anodes", J. Electrochem. Soc., vol. 138, No. 10, 2864–2868, Oct. 1991.

J. Farcy, J.P. Pereira–Ramos, L. Hernan, J. Morales, and J.L. Tirado, "Cation–Deficient Mn–Co Spinel Oxides as Electrode Material for Rechargeable Lithium Batteries", Electrochimica Acta, vol. 39, No. 3, 339–345, 1994 (Month N/A).

R.J. Gummow, A. deKock, M.M. Thackeray, "Improved Capacity Retention in Rechareable 4 V Lithium/Lithium–Manganese Oxide (Spinel) Cells", Solic State Ionics, vol. 69, 1994 (Month N/A).

H. Huang and P.G. Bruce, "A 3 Volt Lithium Manganese Oxide Cathode for Rechargeable Lithium Batteries", J. Electrochem. Soc., vol. 141, No. 7, Jul. 1994.

J. Gopalakrishnan, "Chimie Douce Approaches to the Synthesis of Metastable Oxide Materials", Chemistry of Materials, American Chemical Society, vol. 7, No. 7, Jul. 1995.

A.R. Wizansky, P.E. Rauch, and F.J. Disalvo, "Powerful Oxidizing Agents for the Oxidative Deintercalation of Lithium from Transition–Metal Oxides", Journal of Solid State Chemistry, 81, 203–207, 1989 (Month N/A).

(List continued on next page.)

*Primary Examiner*—M. Nuzzolillo
*Attorney, Agent, or Firm*—Linda Deschere

[57] ABSTRACT

The invention provides a rechargeable lithium battery which comprises an electrolyte; a negative electrode having a compatible active material; and a positive electrode comprising a lithium copper oxide intercalation compound. The positive electrode active material is characterized by an ability to deintercalate lithium ions for intercalation into the negative electrode active material. The lithium copper oxide has a proportion of 2 lithium ions per formula unit of the copper oxide and upon electrochemical interaction with a negative electrode deintercalates lithium ions whereupon the proportion of lithium ions per copper oxide formula unit is less than 2. The lithium copper oxide is a compound represented by the nominal general formula Li$_2$CuO$_2$. The lithium copper oxide compound is alternatively represented by the nominal general formula Li$_{2-x}$CuO$_2$, signifying its capability to deintercalate lithium.

20 Claims, 4 Drawing Sheets

OTHER PUBLICATIONS

F. Sapiña, J. Rodríguez–Carvajal, M.J. Sanchis, R. Ibañez, A. Beltrán, and D. Beltrán, "Crystal and Magnetic Structure of $Li_2CuO_2$,", Solid State Communications, vol. 74, No. 8, 779–784, 1990 (Month N/A).

R. Berger and L.E. Tergenius, "Room Temperature Synthesis and Structural Characterization of Monoclinic $LiCuO_2$ by X–ray and Neutron Diffraction", Journal of Alloys and Compounds, 203–207, 1994 (Month N/A).

K. Imai, M. Koike, H. Takei, H. Sawa, D. Shiomi, K. Nozawa, and M. Kinoshita, "Preparation, Crystal Structure and Magnetic Property of a New Compound $LiCuO_2$", Journal of The Physical Society of Japan, vol. 61, No. 5, 1819–1820, May 1992.

M.T. Weller and D.R. Lines, "Structure and Oxidation State Relationships in Ternary Copper Oxides", Journal of Solid State Chemistry, 82, 21–29, 1989 (Month N/A).

J. Barker, "Three Electrode Electrochemical Voltage Spectroscopy (TEVS): Evaluation of a Model Lithium Ion System", Electrochimica Acta, vol. 40, No. 11, 1603–1608, 1995 (Month N/A).

LITHIUM COPPER OXIDE CATHODE FOR LITHIUM CELLS AND BATTERIES

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells containing electrochemically active (electroactive) materials. Such cells typically include an anode (negative electrode) of metallic lithium, a cathode (positive electrode) typically a transition metal chalcogenide and an electrolyte interposed between spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. Cells having metallic lithium anode and metal chalcogenide cathode are charged in an initial condition. During discharge, lithium ions from the metallic anode pass through the liquid electrolyte to the electrochemically active (electroactive) material of the cathode whereupon electrical energy is released.

Batteries with anodes of metallic lithium are described in U.S. and foreign patents and contain metal chalcogenide oxidizing agents as the cathode active material. Such materials include $CuF_2$, $CuS$, $CuO$, $FeS$, $CdF_2$, and $MnO_3$. The reaction with CuO (cupric oxide) is typical and is $2Li+CuO=Li_2O+Cu$, giving rise to still another metallic species, the Cu. These batteries are not rechargeable because the lithium from the metallic anode is converted to lithium oxide ($Li_2O$), lithium fluoride (LiF), or lithium sulfide ($Li_2S$). Such non-rechargeable batteries are called primary batteries. Sometimes a lithium-containing species was added to the electrode to achieve an average voltage between that of the metal chalcogenide oxidizing agent and the lithium-containing species. The oxidizing metal chalcogenide with their attendant disadvantages are described for example in U.S. Pat. Nos. 3,711,334; 3,393,092; and Japanese Patent Nos. 1-163969 and 62-190657. Such batteries are very undesirable because electrodes containing metallic lithium readily degrade, form high surface area metallic powder, and react violently with moisture and air.

It has recently been suggested to replace the lithium metal anode with an intercalation anode, such as a lithium metal chalcogenide or lithium metal oxide. A carbon anode such as coke and graphite are also intercalation materials. Such negative electrodes are used with lithium containing intercalation cathodes, in order to form an electroactive couple in a cell. Such cells, in an initial condition, are not charged. In order to be used to deliver electrochemical energy, such cells must be charged in order to transfer lithium to the anode from the lithium containing cathode. During discharge the lithium is transferred from the anode back to the cathode. During subsequent recharge, the lithium is transferred back to the anode where it reintercalates. Upon subsequent charge and discharge, the lithium ions ($Li^+$) are transported between the electrodes. Such rechargeable batteries, having no free metallic species are called rechargeable ion batteries or rocking chair batteries. See U.S. Pat. Nos. 5,418,090; 4,464,447; 4,194,062; and 5,130,211.

Preferred positive electrode active materials include $LiCoO_2$, $LiMn_2O_4$, and $LiNO_2$. The cobalt compounds are relatively expensive and the nickel compounds are difficult to synthesize. A relatively economical positive electrode is $LiMn_2O_4$, for which methods of synthesis are known, and are reactions generally between stoichiometric quantities of a lithium containing compound and a manganese containing compound. Common precursors are, for example, lithium salt, $MnO_2$, lithium hydroxide, and acetate compounds as disclosed in U.S. Pat. Nos. 4,246,253 and 5,135,732. The $LiMn_2O_4$, like the nickel and cobalt compounds, has a disadvantage in that the charge capacity of a cell comprising such cathode suffers a significant loss in capacity. That is, the initial capacity available (Amp hours/gram) from $LiMn_2O_4$, $LiNO_2$, and $LiCoO_2$ is less than the theoretical capacity because less than 1 atomic unit of lithium engages in electrochemical reaction. Such initial capacity value is significantly diminished during the first cycle operation and such capacity further diminishes on every successive cycle of operation. Since not all the entire theoretical capacity of $Li_1Mn_2O_4$ is available for reaction the electrochemical activity is as follows:

Equation I:

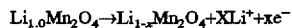

$$Li_{1.0}Mn_2O_4 \rightarrow Li_{1-x}Mn_2O_4 + XLi^+ + xe^-$$

Even assuming all the lithium is extracted, the specific capacity at best is 148 milliamp hours per gram. As described by those skilled in the field, the best that one might hope for is reversible capacity on the order of 110 to 120 milliamp hours per gram. Obviously, there is a tremendous difference between the theoretical capacity (assuming all lithium is extracted from $LiMn_2O_4$) and the actual capacity when 0.8 lithium is extracted as observed during operation of a cell ($Li_1Mn_2O_4 \rightarrow Li_{0.2}Mn_2O_4$). In U.S. Pat. No. 4,828,834 Nagaura et al attempted to reduce capacity fading by sintering precursor lithium salt and $MnO_2$ materials and thereby forming an $LiMn_2O_4$ intercalation compound. However, Nagaura's $LiMn_2O_4$ compounds suffered from a very low capacity.

There remains the difficulty of obtaining a lithium containing chalcogenide electrode material having acceptable capacity without disadvantage of significant capacity loss when used in a cell.

SUMMARY OF THE INVENTION

The invention provides a rechargeable lithium battery which comprises an electrolyte; a negative electrode having a compatible active material; and a positive electrode comprising a lithium copper oxide intercalation compound. The positive electrode active material is characterized by an ability to deintercalate lithium ions for intercalation into the negative electrode active material. The lithium copper oxide has a proportion of 2 lithium ions per formula unit of the copper oxide and upon electrochemical interaction with a negative electrode deintercalates lithium ions whereupon the proportion of lithium ions per copper oxide formula unit is less than 2. The lithium copper oxide is a compound represented by the nominal general formula $Li_2CuO_2$. The lithium copper oxide compound is alternatively represented by the nominal general formula $Li_{2-x}CuO_2$, signifying its capability to deintercalate lithium. The active material of the negative electrode is any material compatible with the lithium copper oxide positive electrode active material. Metallic lithium may be used as the negative electrode active material where lithium is removed and added to the metallic negative electrode during use of the cell. The negative electrode is desirably a non-metallic intercalation compound. Desirably, the negative electrode comprises an active material from the group consisting of metal oxide, particularly transition metal oxide, metal chalcogenide, carbon, graphite, and mixtures thereof. It is preferred that the anode active material comprises graphite.

The present invention resolves the capacity problem posed by widely used cathode active material. It has been found that the capacity of a cell having the $Li_2CuO_2$ cathode is greatly improved, for example, over $LiMn_2O_4$, providing on the order of twice the specific capacity of the conventional $LiMn_2O_4$ but at a slightly lower voltage.

Objects, features, and advantages of the invention include an improved electrochemical cell or battery based on lithium which has improved charging and discharging characteristics, a large discharge capacity, and which maintains its integrity during cycling. Another object is to provide a cathode active material which combines the advantages of large discharge capacity and with relatively lesser capacity fading. It is also an object of the present invention to provide positive electrodes which can be manufactured more economically and relatively more conveniently, rapidly, and safely than present positive electrodes which react readily with air and moisture. Another object is to provide a method for forming cathode active material which lends itself to commercial scale production providing for ease of preparing large quantities.

These and other objects, features, and advantages will become apparent from the following description of the preferred embodiments, claims, and accompanying drawings.

DETAILED DESCRIPTION OF THE PREFERRED EMBODIMENTS

The present invention provides lithium copper oxide active material which for the first time is used as a cathode active material source of $Li^+$ ions; where upon extraction of x lithium ions from $Li_{2-x}CuO_2$, significant specific capacity is achieved. Such specific capacity achieved from lithium copper oxide ($Li_{2-x}CuO_2$) is far in excess of the specific capacity observed from $Li_1Mn_2O_4$ ($Li_{1-x}Mn_2O_4$), an example of a currently used cathode active material. In the method of the invention, electrochemical energy is provided by deintercalation of lithium from $Li_2CuO_2$. When one lithium is removed per formula unit of the copper oxide, $Cu^{II}$ is oxidized to $Cu^{III}$. The reaction is as shown below:

Equation II:

Figure 1:
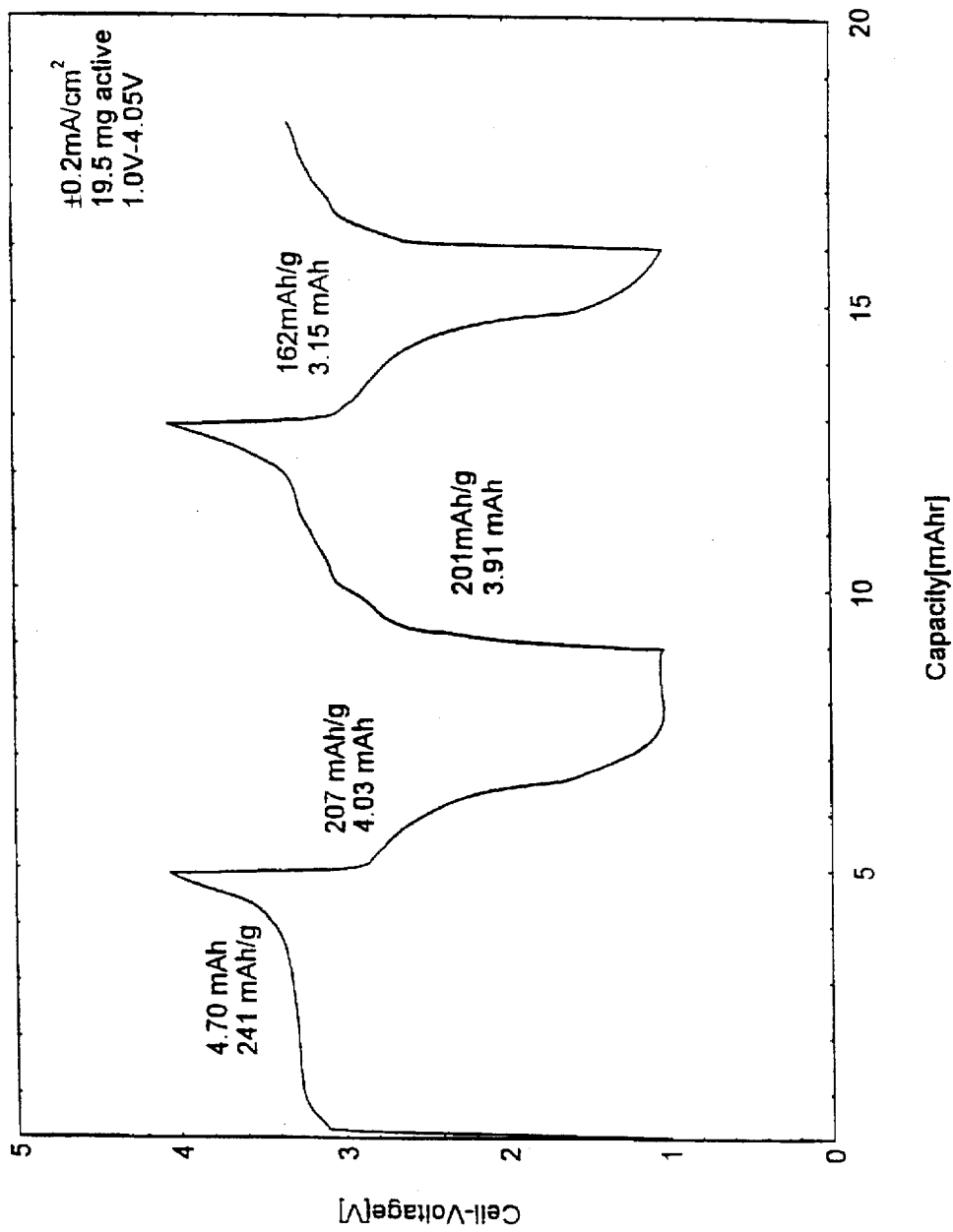
FIG. 1 is a voltage/capacity plot of $Li_2CuO_2$ cycled with a lithium metal anode using constant current cycling at ±0.2 milliamp per square centimeter.

This material has 245 milliamp hours per gram specific capacity upon electrochemical oxidation as per the reaction shown immediately above. The electrochemical extraction of lithium from $Li_2CuO_2$ has heretofore not known to have been described. FIG. 1 which will be described more particularly below shows a capacity in actual use of about 241 milliamp hours per gram where the $Li_2CuO_2$ cathode of the invention was tested in a cell comprising a lithium metal counter-electrode and an EC:PC-$LiPF_6$ electrolyte, with operation between about 3.2 and 4 volts versus $Li/Li^+$ where one lithium is removed as described above.

It is also possible to conduct an electrochemical reaction according to Equation III below:

Equation III:

However, $Cu^{IV}$ is considered to be relatively unstable. Although this reaction was demonstrated during testing of the invention, this reaction (Equation III) is only partially reversible. Assuming reaction per Equation III was completely reversible, the capacity would be nearly double, that is around 490 milliamp hours per gram. This capacity is remarkable compared to the theoretical capacity of 148 milliamp hours per gram of $LiMn_2O_4$ conventional cathode material and the 110 to 120 milliamp hours per gram typically observed capacity of the $LiMn_2O_4$ active material.

In another aspect, the invention provides a lithium ion battery which comprises an electrolyte; a negative electrode having an intercalation active material; and a positive electrode comprising a lithium copper oxide intercalation compound. The positive electrode active material is characterized by an ability to deintercalate lithium ions for intercalation into the negative electrode active material. The lithium copper oxide is a compound represented by the nominal general formula $Li_2CuO_2$. The lithium copper oxide compound is alternatively represented by the nominal general formula $Li_{2-x}CuO_2$, signifying its capability to deintercalate lithium. The present invention resolves the capacity problem posed by conventional cathode active materials. Such problems with conventional active materials are described by Tarascon in U.S. Pat. No. 5,425,932, using $LiMn_2O_4$ as an example. Similar problems are observed with $LiCoO_2$, $LiNiO_2$, and many, if not all, lithium-metal-chalcogenide materials. The present invention demonstrates that the capacity of a cell having the $Li_2CuO_2$ cathode is greatly improved over $LiMn_2O_4$, providing on the order of twice the specific capacity of the conventional $LiMn_2O_4$ but at a slightly lower voltage.

The positive electrode active material, in an initial condition, is represented by the molecular formula $Li_2CuO_2$. When used in a cell it deintercalates a quantity of x lithium ions for intercalation into the negative electrode, where the amount of x ions deintercalated is greater than 0 and less than or equal to 2. Accordingly, during cycling, charge and discharge, the value of x varies as x greater than or equal to 0 and less than or equal to 2. In the case where it is only desired to extract 1 atomic unit of lithium from the $Li_2CuO_2$ during battery operation, then, during cycling, charge and discharge, the value of x varies as x greater than or equal to 0, and less than or equal 1.

Figure 2:
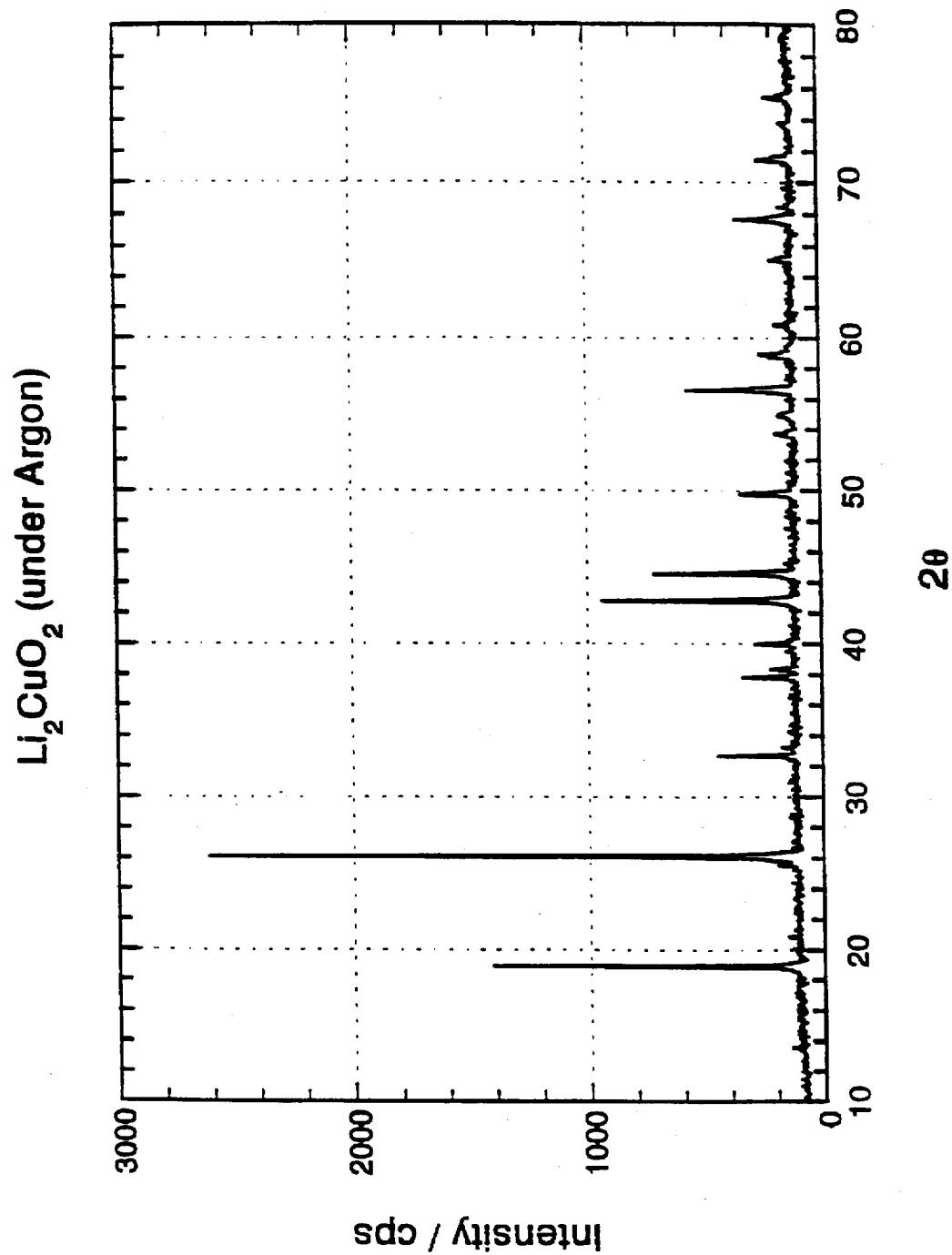
FIG. 2 shows the result of an x-ray diffraction analysis of the $Li_2CuO_2$ prepared according to the invention, conducted using the CuKα radiation, λ=1.5418 Å type radiation.
Figure 3:
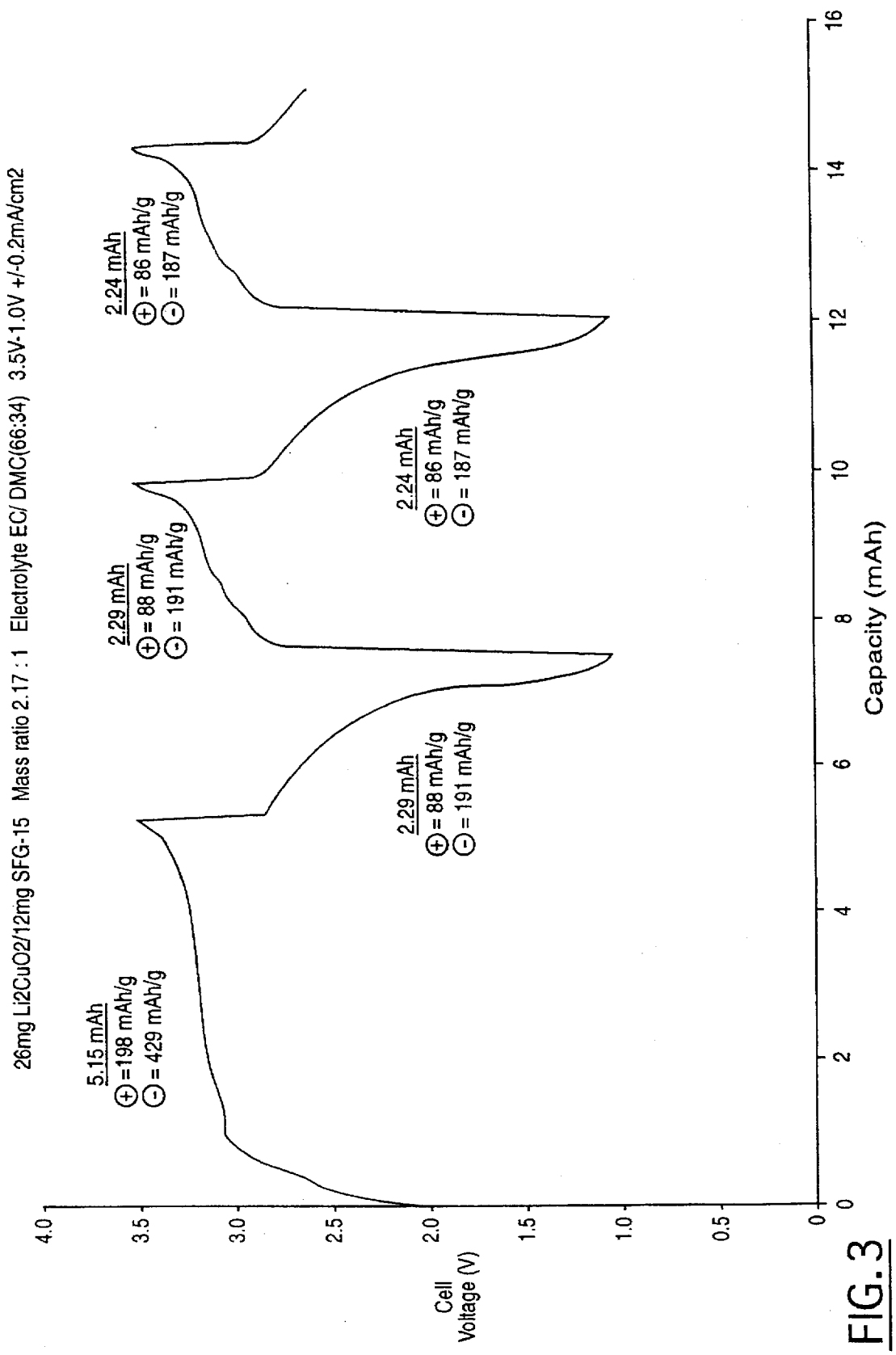
FIG. 3 is a voltage/capacity plot of $Li_2CuO_2$ cycled with a graphite anode using constant current cycling at ±0.2 milliamp per square centimeter.

Positive electrode lithium copper oxide active material was prepared and tested in electrochemical cells and the results are reported in FIGS. 1 to 3. A typical cell configuration will be described with reference to FIG. 4.

Figure 4:
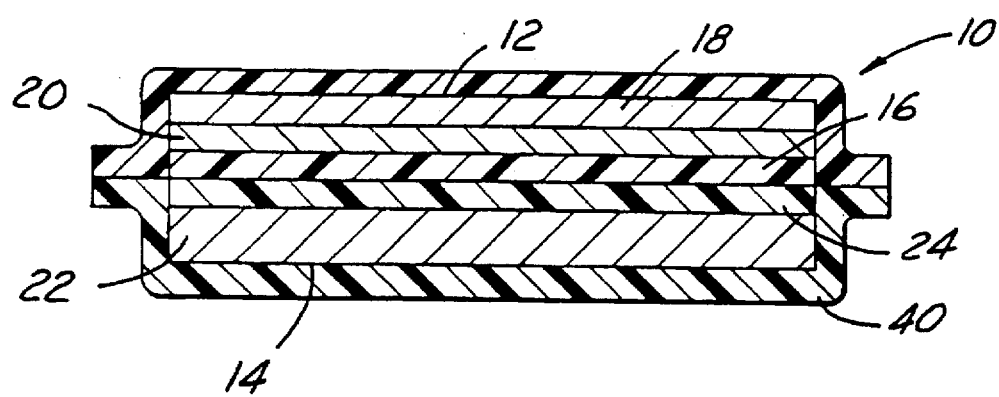
FIG. 4 is an illustration of a cross section of a thin battery or cell embodying the invention.

A description of the electrochemical cell or battery which uses the novel active material of the invention will now be described. By convention, an electrochemical cell comprises a first electrode, a counter-electrode which reacts electrochemically with the first electrode, and an electrolyte which is capable of transferring ions between the electrodes. A battery refers to one or more electrochemical cells. Referring to FIG. 4, an electrochemical cell or battery 10 has a negative electrode side 12, a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum, nickel, and stainless steel, and such foils may have a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any lithium ion containing conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; and 5,037,712. Each of the above patents is incorporated herein by reference in its entirety.

Electrodes of the invention are made by mixing a binder, the active material, and carbon powder (particles of carbon). The binder composition is desirably a binder, such as polymers, a paste containing the binder, active material, and carbon, is coated onto a current collector.

Positive Electrode

A positive electrode containing the lithium copper oxide active material of the invention is prepared by the following method. For the positive electrode, the content was as follows: 50 to 90 percent by weight active material ($Li_2CuO_2$); 5 to 30 percent carbon black as the electric conductive diluence; and 3 to 20 percent binder. The stated ranges are not critical. The amount of active material may range from 25 to 85 weight percent. The formation of each electrode will now be described- The positive electrode was prepared from mixtures of lithium-manganese oxide (active material) and EPDM (ethylene propylene diene monomer) as the binder, Shawinigan Black® was used as the carbon powder conductive diluent. The carbon powder conductive diluent is used to enhance electronic conductivity of the lithium-manganese oxide. Shawinigan Black®, available from Chevron Chemical Company, San Ramone, Calif., has a BET average surface area of about 70±5 square meters per gram. Other suitable carbon blacks are sold under the designation Super P™ and Super S™ available from MMM, a subsidiary of Sedema, which carbons have BET surface areas of about 65±5 square meters per gram. (MMM has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the lithium copper oxide active material, the binder (EPDM), and the carbon particles (Shawinigan Black®). These were mixed and blended together with a solvent. Xylene is a suitable solvent. The mixture was then coated onto an aluminum foil current collector to achieve a desired thickness for the final electrode.

Electrolyte

The electrolyte used to form the completed cell was a combination of EC/DMC when a carbon anode was used. That is, ethylene carbonate (EC) and dimethyl carbonate (DMC). The ratio of EC:DMC was about 2:1 by weight. Generally, when a lithium metal anode is used, the electrolyte is EC:PC (propylene carbonate) in 50:50 by weight ratio. In both cases, the salt used with the solvent was 1 molar $LiPF_6$. Positive and negative electrodes were maintained in a separated condition using a fiber glass layer. Such separation can also be achieved using a layer of Celgard™. Hoechst—Celanese Corp., Celgard 2400™, porous polypropylene, 25 microns thick.)

Negative Electrode

The electrochemical cell used with the positive electrode and electrolyte may contain one of a variety of negative electrode active materials. In one embodiment, the negative electrode may be metallic lithium. In more desirable embodiments, the negative electrode is an intercalation active material, such as, metal oxides and graphite. When a metal oxide active material is used, the components of the electrode are the metal oxide, electrically conductive carbon black, and binder in the proportions as described above for the positive electrode. Representative, but not limiting, examples include coke, graphite, $WO_3$, $Nb_2O_5$, and $V_6O_{13}$. It is thought that $Li_xCuO_2$ may also be used as the negative electrode active material; however, the voltage would likely be low, as in, for example, $Li_2CuO_2$ electrode versus $Li_1CuO_2$ counter-electrode. In a preferred embodiment, the negative electrode active material is graphite particles. For test purposes, for determining capacity of a positive electrode, test cells were fabricated using both the lithium metal active material and carbon (graphite). Accordingly,. the cells assembled for testing and the results described hereinbelow are based on the positive electrode active material comprising the $Li_2CuO_2$ of the invention initially tested against a lithium metal counter-electrode. Then cells were formed such as to be used as batteries, and had a non-metallic intercalation graphite electrode. The preferred negative electrode comprises about 80 to 95 percent by weight graphite particles, and more preferably about 90 percent by weight with the balance constituted by a binder. Preferably, the anode is prepared from a graphite slurry as follows. A polyvinylidene difluoride (PVDF) solution is prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry is prepared by first adding 36 grams of graphite (SFG-15) into about 38.5 grams of the PVDF solution. The mixture is homogenized with a commercial homogenizer or blender. (For example, Tissue Homogenizer System from Cole-Parmer Instrument Co., Niles, Ill.). The viscosity of the slurry is adjusted to about 200 cp with additional PVDF solution. The slurry is coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

Various methods for fabricating electrochemical cells and for forming electrode components are described herein. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. Nos. 5,435,054 (Tonder & Shackle); 5,300,373 (Shackle); 5,262,253 (Golovin); 4,668,595; and 4,830,939 (Lee & Shackle). Each of the above patents is incorporated herein by reference in its entirety.

Comparative Case

As stated earlier, for the theoretical electrochemical extraction according to: $Li_1Mn_2O_4$ goes to $Li_0Mn_2O_4$, the theoretical specific capacity is 148 milliamp hours per gram. However, this theoretical capacity is not realized during operation of an electrochemical cell. Rather, during electrochemical extraction, the effected specific capacity is limited to the extraction of 0.8 atomic units of lithium per atomic formula unit of $LiMn_2O_4$. Accordingly, the electrochemical reaction is designated by $Li_1Mn_2O_4$ goes to $Li_{0.2}Mn_2O_4$ providing 110 to 120 milliamp hours per gram, with 0.8 atomic units of lithium extracted. Then, during cycling of a cell additional capacity loss occurs and less than 0.8 units of lithium ion is cycled. (See above regarding Tarascon, U.S. Pat. No. 5,425,932.) Taking the case of the cell where the $LiMn_2O_4$ cathode is cycled with graphite, on first charge there is utilized the equivalent of about 375 milliamp hours per gram of the graphite's specific capacity. On first charge, there is extracted 125 milliamp hours per gram from the $LiMn_2O_4$ which is inserted into the graphite anode providing 375 milliamp hours per gram. Note the mass ratio of 375:125 equivalent to 3:1. After the first cycle, approximately 15 percent capacity is lost. After the first cycle, the capacity of the $LiMn_2O_4$ falls to approximately 106 milliamp hours per gram and that of the graphite anode to approximately 318 milliamp hours per gram cycling on the 4 volt plateau for the lithium manganese oxide. This results in a loss compared to theoretical of (148–106)/148 or 28 percent.

To overcome the deficiencies cited above with respect to the base case Comparative Example, a cell was prepared using lithium copper oxide which provides on the order of twice the specific capacity of the conventional lithium manganese oxide cathode material, but at a slightly lower voltage, on the order of about 3 volts, more specifically, 3.4 to 3.5 volts on lithium extraction from $Li_2CuO_2$, as compared to 4 volts for the lithium manganese oxide.

EXAMPLE I

A preferred procedure for forming the $Li_2CuO_2$ compound active material will now be described. The basic procedure comprises conducting a reaction between lithium hydroxide and copper oxide. The lithium hydroxide is of the formula LiOH and the copper oxide starting material formula is CuO. The copper oxide starting material (CuO) is available as a 99 percent pure compound from Aldrich Chemical Company. Lithium hydroxide (LiOH) is available from a number of chemical outfits including Fluka and Aldrich. Both the copper oxide and lithium hydroxide are in powder or particle form. More than one batch of the active material was prepared. A typical batch comprised a mixture of 9.576 grams of lithium hydroxide (LiOH) and 7.96 grams of copper oxide (CuO). Theoretical it is possible to use stoichiometric amounts of the copper oxide and lithium hydroxide. However, it is preferred to use about 5 percent excess by weight of lithium hydroxide as compared to what is required in a stoichiometric formulation. In this procedure, near stoichiometric amounts of the copper oxide were mixed with lithium hydroxide for about 30 minutes. However, prior to such mixing the lithium hydroxide salt was predried at about 120° C. for about 24 hours. Then the lithium salt was thoroughly ground to bring its particle size closer to that of the particle size of the copper oxide as received (less than 5 microns). The mixture of lithium hydroxide and copper oxide were then pressed into pellets at a pressure in excess of about 10 tons per square inch. The pellets were put in an alumina crucible and heated in an inert atmosphere at a rate of 2° C. per minute. Such heating was conducted to achieve 455° C. temperature whereupon the mixture was held at such temperature for 12 hours. Then the temperature was ramped again at the same rate to achieve a temperature of 825° C. and then held at such temperature for an additional 24 hours. The furnace containing the mixture was permitted to cool down and then the entire procedure was repeated with an initial ramp up heating at a rate of 2° C. per minute to achieve the 455° C. temperature which was held for 6 hours, and then the same ramp rate to achieve 650° C. for 6 hours, and then the same ramp rate to achieve 825° C. for 12 hours.

The x-ray pattern as shown in FIG. 2 showed no peaks due to the presence of either copper oxide or lithium hydroxide precursor, which means that the reaction is essentially entirely completed. Atomic Absorption Spectroscopy showed that the lithium content of the final product was 12.29 percent compared to a theoretical calculation of 12.68 percent. This demonstrates that the product of the invention, according to CuKα radiation, as shown in FIG. 2, was indeed the nominal general formula $Li_2CuO_2$. The term "nominal general formula" refers to the fact that the relative proportion of atomic species may vary slightly on the order of 2 percent to 5 percent, or more typically, 1 percent to 3 percent. For example, nominal $LiMn_2O_4$ may be $Li_{1.05}Mn_2O_4$.

The entire procedure of preparation was conducted in an inert atmosphere which was argon, excluding the obtaining of the x-ray pattern. It should be noted that the $Li_2CuO_2$ of the invention may also be prepared from lithium oxide and copper oxide starting materials according to the reaction:

Equation IV:

$$Li_2O + CuO \longrightarrow Li_2CuO_2$$

It is also possible to prepare the $Li_2CuO_2$ product according to the reaction:

Equation V:

$$Li_2O_2 + CuO \longrightarrow Li_2CuO_2 + \tfrac{1}{2}O_2$$

However, it was preferred to prepare the $Li_2CuO_2$ according to the above described Example I using lithium hydroxide and copper oxide according to the reaction:

Equation VI:

$$2LiOH + CuO \longrightarrow Li_2CuO_2 + 1H_2O$$

EXAMPLE II

The $Li_2CuO_2$, prepared as described immediately above, was tested in an electrochemical cell. The positive electrode was prepared as described above under the section designated "Positive Electrode". The negative electrode was metallic lithium. The electrolyte was a 50:50 weight percent solution of ethylene carbonate and propylene carbonate within which was dissolved 1 molar $LiPF_6$. The cell was cycled between about 1.0 and 4.05 volts with performance as shown in FIG. 1. FIG. 1 was based upon about 0.2 milliamp hours per square centimeter and about 19.5 milligrams of the $Li_2CuO_2$ active material in the cathode (positive electrode). In an as assembled initial condition, the positive electrode active material is $Li_2CuO_2$. The lithium is deintercalated from $Li_2CuO_2$ during charging of the cell. When fully charged about 1 unit of lithium has been removed per formula unit of the original lithium copper oxide. Consequently, the positive electrode active material corresponds to about $Li_1CuO_2$ (FIG. 1). In this fully charged condition the electrochemical potential versus lithium of the $Li_1CuO_2$ is about 4 volts. The deintercalation of 1 lithium from $Li_2CuO_2$ resulting in the $Li_1CuO_2$ represents approximately 241 milliamp hours per gram corresponding to 4.7 milliamp hours. Next, the cell is discharged and shows a slight hysteresis whereupon a quantity of lithium is reintercalated into the $Li_1CuO_2$. The average voltage is approximately 2.5 to 2.3 volts. The reintercalation corresponds to approximately 207 milliamp hours per gram or 4.03 milliamp hours proportional to the intercalation of 0.84 atomic units of lithium. At the bottom of the curve corresponding to approximately 1 volt, the positive electrode active material corresponds to about $Li_{1.84}CuO_2$. The cell is then subsequently recharged whereupon a quantity of lithium ions is again deintercalated. Upon recharging, 0.82 lithium ions is deintercalated corresponding to approximately 201 milliamp hours per gram or 3.91 milliamp hours. Returning to the region of approximately 4 volts, the active material of the positive electrode corresponds to roughly $Li_{1.02}CuO_2$. The cell was again discharged and recharged and then the test was terminated.

EXAMPLE III

Based on the attractive performance exhibited by the cell described in Example II (FIG. 1) using the active material having the characteristics as described in Example I (x-ray diagram FIG. 2) another cell was prepared using the $Li_2CuO_2$ of the invention as the positive electrode active material and using carbon particles sold under the designation SFG-15 as the negative electrode active material. Graphitic material sold under the designation SFG is available from Lonza G.N.T., Ltd. (Sins, Switzerland). The designation SFG-15 refers to a crystalline structure having a BET surface area of about 8.8 square meters per gram and a particle size distribution where essentially 100 percent of the graphite particles have a size less than 48 microns, 99 percent less than 24 microns, 94 percent less than 16 microns, and a median particle size of about 8.1 microns. The electrolyte was a 2:1 ratio by weight of ethylene carbonate (EC) to dimethyl carbonate (DMC) with 1 molar $LiPF_6$ salt. The anode contained 12 milligrams of the graphite active material. The cathode contained 26 milligrams of $Li_2CuO_2$ cathode material.

FIG. 3 is a voltage/capacity graph prepared based on a cell according to Example III. In accordance with Example III, a cathode was prepared with $Li_2CuO_2$ active material and the anode comprised SFG-15 graphite carbon. The data in FIG. 3 was obtained based on constant current cycling at about ±0.2 milliamps per centimeter in the range of 1 volt to 3.5 volts. FIG. 3 shows the first cycle charge of the cell whereby 1 lithium unit is extracted from the $Li_2CuO_2$ ($Li_{2-x}CuO_2$) electrode for intercalation into the graphite negative electrode whereupon the potential increases from 1 to about 3.5 volts. The $Li^+$ ions transferred to the negative electrode are releasably retained with the its structure in a non-metallic state. The positive electrode achieves a specific capacity of about 198 milliamp hours per gram and the anode about 429 milliamp hours per gram (first cycle charge). For a total of 5.15 milliamp hours on initial charge. At this point, at the apex corresponding to about 3.5 volts, 1 atomic unit of lithium has been taken out of the $Li_2CuO_2$ whereby the positive electrode formulation is now $Li_2CuO_2$. Such extracted lithium atomic unit is put into the graphite rendering the cell essentially fully charged. On deintercalation (first cycle discharge) from the apex, lithium is reinserted into the positive electrode so that the content of lithium in the positive electrode again increases representing 88 milliamp hours per gram positive electrode, 199 milliamp hours per gram negative electrode, and 2.29 milliamp hours. Thereafter, the cycling continues rather regularly, with the positive electrode representing 86 to 88 milliamp hours per gram, the negative electrode 187 to 191 milliamp hours per gram, and 2.24 to 2.29 milliamp hours. As in earlier FIG. 1, FIG. 3 demonstrates a slight hysteresis. Nevertheless, the invention demonstrates a significant amount of lithium is cycled between the electrode materials, more than would be cycled between electrodes when using a conventional cathode material such as the widely used $Li_1Mn_2O_4$, if it is desired to cycle on the basis of extraction and insertion of 1 lithium atomic unit. As described earlier, it is theoretically possible, and in testing it has been demonstrated, that 2 atomic units of lithium are extractable from the $Li_2CuO_2$, resulting in the formula unit $CuO_2$.

FIGS. 1 and 3 clearly show and highlight the very high and unexpected amount of reversible lithium ion capacity for the $Li_2CuO_2$ active material of the invention. The positive electrode showed a performance of 207 milliamp hours per gram on the first discharge. This is in excess of the amount of lithium cycled in a conventional $LiMn_2O_4$, and is far in excess of the typical 110 milliamp hours per gram of $LiMn_2O_4$ on first discharge.

Before the present invention, the dilemma of solving the capacity problem has heretofore not been solved. It has been demonstrated that the capacity of a cell having the $Li_2CuO_2$ cathode is greatly improved over the widely used $LiMn_2O_4$ and over any other cathode material in present use. A cell prepared using lithium copper oxide provides on the order of twice the specific capacity of the conventional lithium manganese oxide cathode material, but at a lower voltage, about 3.4 and 3.5 volts ($Li_2CuO_2$), as compared to 4 volts for the lithium manganese oxide. Advantageously, the $Li_2CuO_2$ is air and moisture stable. This was verified by exposing $Li_2CuO_2$ to ambient conditions in a room for over 2 weeks. No signs of degradation or oxidation were observed. The $Li_2CuO_2$ has an open circuit voltage of over 3 volts versus lithium (3.4 to 3.5 volts), corresponding to the observed stability. As lithium is extracted from $Li_2CuO_2$ active material during cell operation, the material becomes even more air and moisture stable. The lithium copper oxide intercalates more lithium at lower voltage relative to lithium manganese oxide. At such lower voltages, the lithium copper oxide is air stable, relative to lithium manganese oxide. The above described capacities assume 1 mole of lithium ion is accepted/released per formula unit of the copper oxide ($CuO_2$). Since the lithium cooper oxide of the invention has 2 atomic units of lithium per formula unit of $CuO_2$, more than one lithium may be cycled resulting in even higher capacities, up to 490 milliamp hours per gram.

The powerful advantage of the $Li_2CuO_2$ positive electrode active material can be further understood by reference to weight percentages, as per Table I.

TABLE I

| (1) Atom | (2) Atomic Unit | (3) Atomic Weight | (4) Col 2 × 3 | (5) Weight Fraction | (6) Weight Percent |
|---|---|---|---|---|---|
| $Li_2CuO_2$ | | | | | |
| Li | 2 | 7 g | 14 | 14/110 | 13 |
| Cu | 1 | 64 g | 64 | 64/110 | 58 |
| O | 2 | 16 g | 32 | 32/110 | 29 |
| | | | 110 g | | 100 |

The $Li_2CuO_2$ contains 2 atomic units of lithium for each formula unit of the oxide, corresponding to 40 atomic percent lithium (2/5 = 0.4).

| | | | $LiMn_2O_4$ | | |
|---|---|---|---|---|---|
| Li | 1 | 7 g | 7 | 7/181 | 4 |
| Mn | 2 | 55 g | 110 | 110/181 | 61 |
| O | 4 | 16 g | 64 | 64/181 | 35 |
| | | | 181 g | | 100 |

The $LiMn_2O_4$ contains 1 atomic unit of lithium for each formula unit of the oxide, corresponding to about 14 atomic percent lithium (1/7 = 0.14).

Thus, the $Li_2CuO_2$ has 2 atomic units of lithium per formula unit of the copper oxide (metal oxide); and 13 weight percent lithium per formula unit of the copper oxide. The $LiMn_2O_4$ has only 1 atomic unit of lithium per formula unit of the manganese oxide (metal oxide); and only 4 weight percent lithium per formula unit of $LiMn_2O_4$. In the case of $LiMn_2O_4$, not all of the single atomic unit of lithium is reversibly cycleable due to irreversible loss. Thus, the amount of lithium reversibly cycled with the $LiMn_2O_4$ material is less than 1 atomic unit of lithium. In contrast, the $Li_2CuO_2$ has 2 atomic units available for cycling; even assuming that only half the lithium in $Li_2CuO_2$ is cycled, the amount of lithium cycled per formula unit of metal oxide is significantly greater than in the case of $LiMn_2O_4$. It is thought that this same advantage exists over all other known and commonly used lithium metal chalcogenides, such as, $LiCoO_2$ and $LiNiO_2$. For example, if 1 lithium per $LiCoO_2$ or $LiNiO_2$ could be extracted, this would correspond to around 280 milliamp hours per gram. However, in all practical devices only around 0.5 lithium is cycled reversibly corresponding to only 140 milliamp hours per gram.

Lithium ion batteries made with this technology are made in the discharged state and need a conditioning charge (pre-charge) before use. In the initial condition (pre-charged state), anodes of the invention are essentially free of lithium and ions thereof. Such batteries are, therefore, inherently more stable and relatively less reactive than batteries containing $LiMn_2O_4$ or lithium metal.

To achieve a useable potential difference, the (positive electrode) is electrochemically oxidized, while the anode (negative electrode) is reduced. Thus, during charging, a quantity (x) of lithium ions ($Li^+$) leave the positive electrode, $Li_{2-x}CuO_2$, and the positive electrode is oxidized, increasing its potential; during charging, the Li ions are accepted at or intercalated into the carbon-based negative electrode, which is reduced, and the negative electrode has a potential very close to the lithium metal potential, which is zero volts. A typical graphite electrode can intercalate up to about 1 atom of lithium per each of 6 carbons, that is, $Li_0C_6$ to $Li_1C_6$. During discharging, the reverse occurs, and a quantity of (x) of lithium ($Li^+$) ions leave the negative electrode, increasing its potential. During discharge, the lithium ions are accepted (intercalated) back into the positive electrode, which is reduced, and its potential is reduced.

Advantageously, when fully discharged, only up to a minor amount of the anode active material, such as graphite or carbon, is constituted by lithium ions from the $Li_2CuO_2$ cathode because the insertion is essentially reversible. Thus, at worst, only a minor amount of lithium is lost. Thus, when fully discharged, only a minor amount or less than 10 percent to 15 percent of the amount of $Li^+$ at full-charge may remain in the carbon-based anode when fully discharged. The "lost" lithium is generally assumed (at least during the first cycle) to be consumed during creation of an "ionically conducting passivation layer" on the carbon surface. The $Li^+$ ions transferred to the anode are releasably retained within the anode structure. In principle, no free, metallic lithium is present in the anode ever, provided the electrode is not overloaded with lithium (balanced cells required) or lithium ions are transferred to the anode faster then they can diffuse into the negative electrode. Fully discharged means that the battery has reached the lowest allowed voltage. In theory, in the fully discharged state, no lithium ions are present in the anode.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

What is claimed is:

1. A lithium ion battery which comprises a positive electrode and negative electrode, said negative electrode comprising an intercalation active material, and said positive electrode comprising an active material consisting of lithium copper oxide.

2. The battery according to claim 1 wherein said lithium copper oxide is represented by the nominal formula $Li_{2-x}CuO_2$ and deintercalates a quantity x of lithium ions for transfer to said negative electrode, where x is greater than 0 and less than or equal to 2.

3. The battery according to claim 2 where during cycling (charge and discharge) the value of x lithium ions transfer between said electrodes varies as $0<x<2$.

4. The battery according to claim 3 where during cycling (charge and discharge) the value of x varies as $0<x<1$.

5. The battery according to claim 1 wherein said negative electrode intercalation active material is selected from the group consisting of a transition metal oxide, metal chalcogenide, carbon, graphite, and mixtures thereof.

6. The battery according to claim 1 wherein said negative electrode intercalation active material comprises graphite.

7. The battery according to claim 1 further comprising an electrolyte interposed between said positive electrode and said negative electrode, said electrolyte comprising a salt of lithium in a non-aqueous (aprotic) solvent.

8. A reversible lithium battery which comprises an electrolyte; a negative electrode having an active material; and a positive electrode comprising an active material consisting of a lithium copper oxide intercalation compound characterized by an ability to deintercalate lithium ions for transfer to said negative electrode active material on charging of said battery and to intercalate said ions on discharge of said battery.

9. The battery according to claim 8 wherein said lithium copper oxide has a proportion of 2 lithium ions per formula unit of copper oxide; whereupon during deintercalation the proportion of lithium ions per said formula unit is less than 2.

10. The battery according to claim 8 wherein said lithium copper oxide is a compound represented by the nominal formula $Li_2CuO_2$.

11. The battery according to claim 8 wherein said lithium copper oxide is represented by the nominal formula $Li_xCuO_2$ where in an initial or uncharged state x is 2; and in a fully or partially charged state represented by said nominal formula $Li_xCuO_2$ where x is less than 2 and is greater than or equal to 0.

12. The battery according to claim 8 which does not contain metallic lithium.

13. The battery according to claim 8 further comprising an electrolyte interposed between said positive electrode and said negative electrode, said electrolyte comprising a salt of lithium in a non-aqueous (aprotic) solvent.

14. A method for operating an electrochemical cell comprising:
   a. providing first electrode composition comprising an active material consisting of lithium copper oxide, a counter-electrode to said first electrode, and an electrolyte therebetween;
   b. electrochemically deintercalating lithium ions from the lithium copper oxide and transferring said ions to the counter-electrode to charge said cell; and then
   c. electrochemically removing at least a portion of said transferred lithium ions from said counter-electrode for reintercalation into said lithium copper oxide whereupon electrochemical energy is obtained from the cell during discharge.

15. The method according to claim 14 wherein said lithium copper oxide has a proportion of 2 lithium ions per formula unit of copper oxide; whereupon during deintercalation the proportion of lithium ions per said formula unit is less than 2.

16. The method according to claim 14 wherein said lithium copper oxide is a compound represented by the nominal formula $Li_2CuO_2$.

17. The method according to claim 14 where in step (a) said lithium copper oxide is represented by the nominal formula $Li_xCuO_2$ where in an initial or uncharged state x is 2; wherein after step (b) and before step (c) said lithium copper oxide is represented by said nominal formula where x is less than 2 and greater than or equal to 0; and wherein after step (c), steps (b) and (c) are repeated in sequence.

18. The battery according to claim 14 wherein said lithium copper oxide is represented by the nominal formula $Li_{2-x}CuO_2$ and deintercalates a quantity x of lithium ions for transfer to said negative electrode, where x is greater than 0 and less than or equal to 2.

19. The battery according to claim 18 where during cycling (charge and discharge) the value of x lithium ions transfer between said electrodes varies as 0<x<2.

20. The battery according to claim 19 where during cycling (charge and discharge) the value of x varies as 0<x<1.

* * * * *